Oct. 24, 1967     D. VINOKUR     3,348,788
POWER-DRIVEN SPINNING REEL ASSEMBLY
Filed Sept. 27, 1965
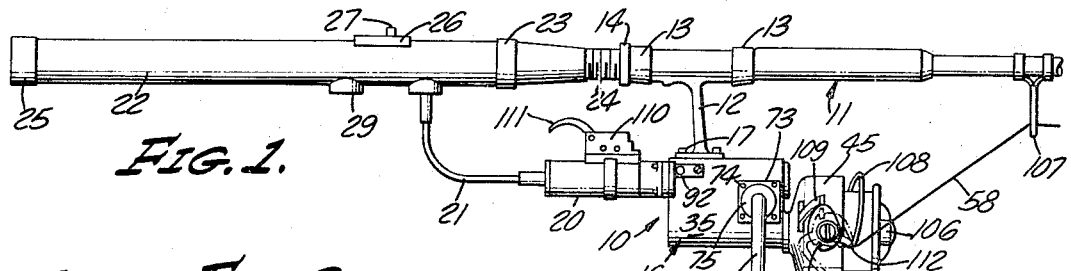
FIG. 1.
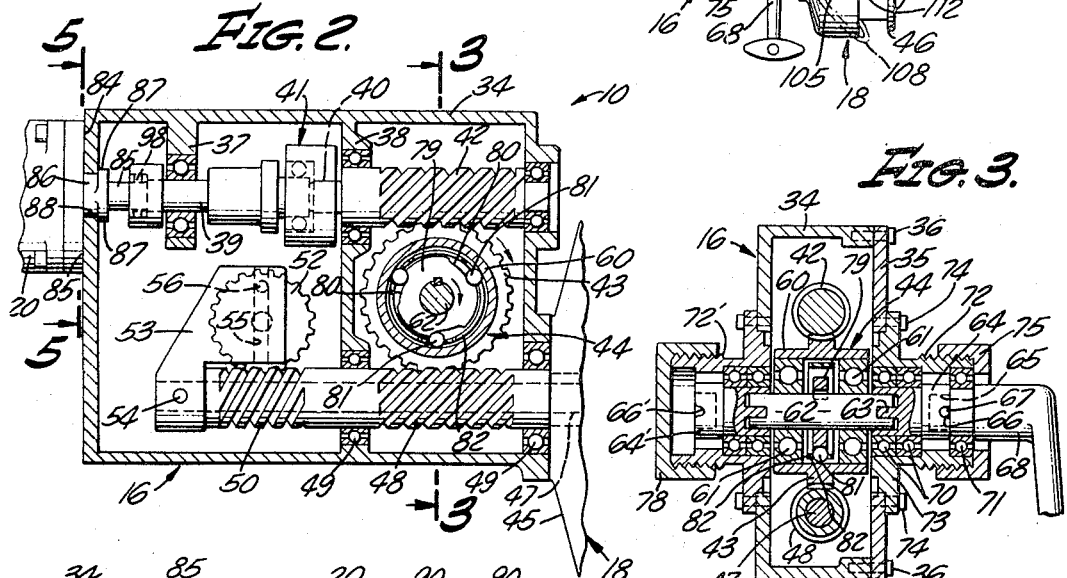
FIG. 2.
FIG. 3.
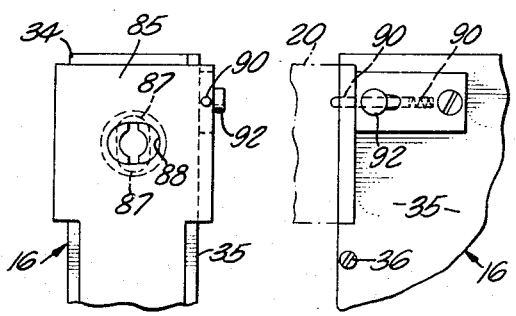
FIG. 5.     FIG. 6.
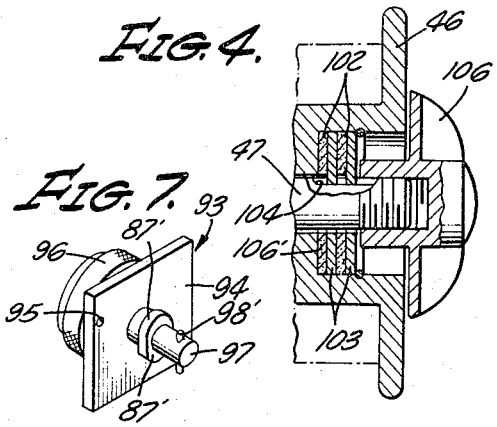
FIG. 4.
FIG. 7.
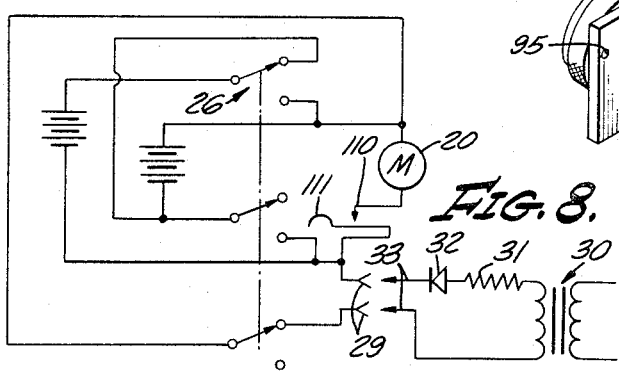
FIG. 8.
INVENTOR.
DAVID VINOKUR
BY
ATTORNEY United States Patent Office 3,348,788
Patented Oct. 24, 1967

3,348,788
POWER-DRIVEN SPINNING REEL ASSEMBLY
David Vinokur, 16217 Dalark St.,
La Puente, Calif. 91744
Filed Sept. 27, 1965, Ser. No. 490,502
22 Claims. (Cl. 242—84.21)

ABSTRACT OF THE DISCLOSURE

A spinning reel which includes a flyer rotated about a reciprocated spool by gearing powered either by a hand crank selectively supported on either side of the reel or an electric motor. Suitable one-way clutches prevent the unused of the alternate drives from having to be turned.

This invention relates to fishing reels and more particularly to a self-contained fishing reel accessory attachable to the handle end of a fishing rod and having its own power supply and driving motor and including provision for driving the reel either manually or by the motor at either of two different speeds.

The present invention is characterized by a simple, highly flexible and reversible spinner-type fishing reel having provision for driving the same selectively either manually or at different speeds by a suitable motor as an electric motor powered by batteries carried in a waterproof housing. Desirably the battery housing includes provision for attaching it directly to the end of the fishing pole handle by simple, easily-operated coupling means enabling the batteries to be detached when not needed. The electric motor for driving the reel is likewise provided with an easily and quickly operated coupling requiring no tools to service the coupling when attaching or detaching it with respect to the power transmission connection to the reel proper. When the motor is detached it is replaced by a simple cover structure serving additionally as means for holding the motor driven shaft against rotation. This lock operates to lock shaft 39 against rotation if a drag placed on the line acts to engage clutch 41 in the reverse direction.

The spinner reel proper is connected to a converter unit having provision for driving the reel selectively by either a right hand or left hand crank as well as by an electric motor at the user's option. The converter housing also includes means for reciprocating the reel spool axially of itself in accordance with customary practice to distribute the line over the length of the spool as it is being wound. The converter device includes a pair of instantly engaging one-way clutches one of which is connected between the hand crank and the drive to the spool and the other of which is located between the ends of the motor driven shaft and is effective when driven by the motor to drive the reel to drive the spool through one component of the first mentioned clutch assembly.

Accordingly it is a primary object of the present invention to provide an improved, self-contained spinner-type fishing reel assembly adapted to be driven selectively either manually or by self-contained power means.

Another object of the invention is the provision of a spinner type fishing reel accessory having provision for driving the reel selectively with either manual or power means at more than one speed.

Another object of the invention is the provision of a power converter unit having a spinner fishing reel mounted on the output shaft thereof and having two power input shafts one of which is adapted to be driven manually and the other of which is adapted to be driven from a power source carried on a fishing rod and featuring automatic means for disconnecting either drive when the other is placed in operation.

Another object of the invention is the provision of a power converter assembly for use between a fishing reel and a power source and so constructed and arranged as to be driven selectively either manually or by the power source and including means automatically responsive to the activation of either drive to deactivate the other.

Another object of the invention is the provision of an electrically driven fishing reel assembly having supplemental manually operated drive means including a crank adapted to be readily converted for use by either the right or left hand at the user's option.

Another object of the invention is the provision of a power-driven fishing reel assembly adapted to be readily and quickly detachably connected to a fishing rod and including a weather proof battery housing for powering an electric motor forming part of the reel assembly and including provision for quickly and easily detaching both the motor unit and the power supply thereby permitting the reel to be operated entirely manually and without the weight of the motor and power supply.

These and other more specific objects will appear upon reading the following specification and claims and upon considering in connection therewith the attached drawings to which they relate.

Referring now to the drawings in which a preferred embodiment of the invention is illustrated.

FIGURE 1 is a fragmentary side elevational view of the handle end of a fishing rod incorporating a preferred embodiment of the invention;

FIGURE 2 is a vertical sectional view on an enlarged scale through the power converter assembly;

FIGURE 3 is a vertical sectional view taken along line 3—3 on FIGURE 2;

FIGURE 4 is a fragmentary sectional view on an enlarged scale taken through the adjustable brake subassembly of the reel;

FIGURE 5 is a fragmentary end elevational view taken along line 5—5 on FIGURE 2 with the electric motor detached;

FIGURE 6 is a fragmentary view taken from the right hand side of FIGURE 5 and showing the coupling holding the motor locked assembled to the converter unit;

FIGURE 7 is a perspective view of a cover plate and driven shaft locking means used in lieu of the motor while the latter is detached from the converter unit; and FIGURE 8 is a schematic view of the electrical circuit.

Referring more particularly to FIGURE 1, there is shown one preferred embodiment of the invention, designated generally 10, shown assembled to the handle end of a conventional fishing rod 11. The invention assembly includes a bracket 12 held releasably to the rod by a pair of ferrules 13, 13 and a sleeve nut 14.

Assembly 10 includes a power conversion subassembly 16 secured to the lower end of bracket 12 by screws 17. A generally conventional spinning type fishing reel 18 is suitably mounted on the forward end of converter unit 16 with its axis extending generally parallel to pole 11. Detachably secured to the rear end of converter unit 16 by means to be described presently is a lightweight enclosed electric motor 20 having a waterproof cable connection 21 with a waterproof battery housing 22. As herein shown, the battery housing is held detachably secured to the rear end of the rod as by clamping nut 23 having threaded engagement with threads 24 of the rod handle. However it will be understood that the battery casing may be secured to the conventional rod handle adjacent the side thereof in any suitable manner as by clips, clamps or the like. Alternatively the battery housing could be carried on the person of the fisherman by a sling and using a somewhat longer flexible service cable 21.

Power supply housing 22 preferably contains rechargeable storage batteries accessible through a waterproof cover 25 closing the outer end of the casing. A control switch 26 has an operating button 27 movable to three different positions in one of which the power supply is disconnected, in a second one of which all batteries are connected in series, and in a third one of which the batteries are connected in series-parallel. A further feature of the battery housing is the provision of a second waterproof female socket 29 for the reception of a service cord plug of battery charging equipment, such as that shown in FIGURE 8. If the batteries are to be charged from a standard 110 volt A.C. power source, a transformer 30 is connected to the power source to step the voltage down to the charging voltage required by the storage batteries. Desirably, the transformer secondary is connected to the batteries through a limiting resistor 31 and a rectifying diode 32 and a service cord 33 provided with a male plug insertable in receptable 29. The batteries are also rechargeable from an automobile storage battery simply by replacing transformer 30 with a male plug connectable to a vehicle battery by insertion in the cigarette lighter on the dashboard of a conventional motor vehicle. The presence of diode 32 safeguards against damage to the accessory storage batteries in case a particular vehicle has the incorrect terminal of its battery grounded to the vehicle body. In this case the fishing reel battery supply will not be charged but neither will it be damaged, as would occur were diode 32 not present.

Referring now more particularly to FIGURES 2 and 3, illustrating constructional details of the power converter, it is pointed out that this unit includes a housing 34 having a cover plate 35 held in place by screws 36. A pair of transverse partitions 37, 38 extending crosswise of this housing support roller bearings for a motor driven shaft formed in two parts 39 and 40. The adjacent ends of these two shafts are interconnected by a one-way clutch assembly 41 to be described in greater detail presently. Shaft 40 includes a high-pitch worm 42 mating with the teeth of a similarly pitched worm gear 43 forming part of a second one-way clutch assembly 44.

Spinning reel assembly 18 is of generally conventional design having a rotating cup or flyer 45 embracing the inner end of a nonrotating spool 46 for the fishing line. This spool is rigidly secured to a shaft 47 having a sliding reciprocating fit within a tubular high-pitch worm sleeve supported in anti-friction bearings 49, 49. Worm 48 meshes with the teeth of worm gear 43 and is parallel with worm 42. A second worm 50 formed along the inner end of worm sleeve 43 also meshes with the teeth of a worm wheel 52 journalled for rotation about a bearing carried on the interior side wall of housing 34. One face of this gear is closely beside one face of an L-shaped bracket 53 secured to the inner end of wheel shaft 47 by pin 54. The face of bracket 53 is provided with a vertical groove 55 seating the free end of a pin 56 secured to the adjacent face of worm wheel 52. In consequene of this arrangement, it will be understood that the rotation of gear 52 carrying pin 56 along groove 55 causes bracket 53 and its attached shaft 47 and spool 46 mounted thereon to reciprocate to-and-fro in a manner well known in this art and effective to store the fishing line 58 in successive layers on the spool.

The one-way clutch 44 is best shown in FIGURES 2 and 3 and includes, as its driven component, a worm wheel 44 having a large-diameter hollow hub 60 supporting anti-friction bearing assemblies 61 within its opposite ends. These bearings support a shaft 62 notched at its opposite ends to receive a transverse tang 63 of a short shaft 64. This latter shaft has a shallow well 65 in its outer end provided with a transverse groove 66 to seat a drive pin 67 carried crosswise of the inner end of a crank 68. Shaft 64 is mounted in bearings 70 whereas the inner end of the crank is preferably supported in a separate bearing assembly 71 supported in a threaded boss 72. The anti-friction bearing assembly 71 has its inner race fixed to the hub of crank 68, the outer race of the bearing assembly seating in an annular seat formed in the outer end of threaded boss 72. This boss is provided with a mounting flange 73 which is secured to cover plate 35 by screws 74. A knurled retainer nut 75 mates with the thread boss 72 and serves to clamp the outer race of bearing 71 immovably within the outer end of this boss.

It will be understood that the opposite side of housing 34 is constructed in the same manner as just described, the similar components being identified by the same reference character distinguished by the use of a prime. Accordingly, crank 68 can be detachably mounted in either boss 72 or 72' simply by removing threaded cap 78 from one boss and loosening the clamping nut 75 so that the crank can be removed from one side of the device and assembled in the same manner on the other boss. Thereafter cap 78 is transferred to the other boss to exclude foreign matter and moisture from entering the housing.

Keyed to clutch shaft 62 is a clutch disc 79 having camshaped cutouts 80 in its rim each seating one of the clutching balls 81 held in assembled position between cutouts 80 and the inner circular surface of hub 60 by a race ring 82. It will be understood that each of the notches 80 has a deep end wherein the balls are barely disengaged from the interior surface of hub 60. However the slightest clockwise rotation of the crankshaft 62 as viewed in FIGURE 2 suffices to roll the balls toward the shallow end of notches 80, forcing the balls into frictional driving engagement with hub 60 thereby causing the worm wheel 43 to rotate with the shaft 62. Contrariwise the slightest counterclockwise movement of the shaft disengages balls 81, allowing the crank to rotate freely without driving the worm wheel.

It will be understood that the second one-way clutch 41, though somewhat smaller in diameter, is constructed similarly to clutch 44 and operates in the same manner, the parts being arranged to drive worm wheel 44 in the same direction as crank 68. It will be understood that the larger diameter component of both clutches 41 and 44 is the driven member. For this reason when the crank is in use to drive the reel, the larger diameter component of both clutches rotate but shaft 39 does not rotate. As is apparent from FIGURE 2, whenever crank 62 is driven clockwise, worm gear 43 is also driven clockwise. However, if the drive is from electric motor 20, worm 42 is effective to drive worm wheel 43 clockwise, thereby disengaging balls 81 so that crank 62 is not driven. The use of crank 68 to rotate cup 45 is ineffective to drive the input shaft 39 of clutch 41 because clutch 41 automatically disengages. However if worm gear 43 is rotated counterclockwise (FIGURE 2), as by a drag applied to the fishing line, then the larger component of clutch 41 becomes a driving member causing clutch 41 to engage. Thereafter further rotation cannot occur because the speed reducing gearing in motor 20 cannot be rotated in the reverse direction.

The means for holding motor 20 detachably locked immovably to converter assembly 16 will be best understood by reference to FIGURES 2, 5 and 6. The motor housing terminates transversely of its gear reduction end in a flat surface 84 adapted to abut a similar flat surface 85 across the rear end wall of housing 35. Surrounding the motor drive shaft 85 is a circular hub 86 formed at diametrically opposed points with radial locking ears 87. The end wall of housing 35 is provided with a complementally shaped noncircular opening 88 (FIGURE 5) receiving ears 87 when the motor is rotated 90 degrees from the position shown in FIGURES 2 and 5. Accordingly the motor is inserted when rotated to this position and is thereafter rotated 90 degrees to lock ears 87 against the inner end of opening 88. To avoid any possibility of the motor becoming accidentally unlocked, a safety lock is provided comprising a reciprocable pin 90 mounted in the upper left hand corner of cover plate 35 (FIGURE 6) and normally urged into its locking position by spring 91. A thumb piece 92 enables the operator to retract the latch pin toward the right as viewed in FIGURE 6, releasing the motor so that it may be rotated 90 degrees to release ears 87 from locking position. The motor can then be withdrawn from the converter assembly.

After the motor has been withdrawn, opening 88 is closed by the cover device 93 shown in FIGURE 7 and operating to lock shaft 39 in the reverse direction from its normal driven direction of rotation. This cover comprises a square plate 94 provided near its rim edge with a detent opening 95 to receive the end of latch pin 90. The center portion of the cover plate is provided with a locking device having locking tabs 87' corresponding to ears 87 for the motor coupling and serving to lock the cover plate to the casing 34 in lieu of the motor. A knob 96 carried by the exterior side of the cover facilitates assembly and disassembly of the cover plate. The locking boss includes a projection 97 having a cross pin 98' adapted to seat in a transverse slot formed in the end of the driven shaft 39 and effective to prevent rotation of this shaft. It will be understood that motor shaft 85 is provided with a similar drive pin 98 forming a drive coupling with shaft 39 of the converter assembly. It will therefore be apparent that either motor 20 or cover plate 93 is always in place over opening 88 thereby closing this opening and both effective to lock shaft 39 against rotation counter to that effective to drive cap 45 in a predetermined direction. Both the motor and the cover plate may be easily and quickly substituted one for the other without need for tools and simply by releasing latch pin 90 while rotating the motor or the cover plate as necessary to lock or unlock either component.

It will be understood that spinning reel 18 is of generally conventional construction. A preferred form is that available in the open market and known as the Quick. Its nonrotating shaft 47 includes an adjustable line drag device at the outer end of spool 46 of the type shown in FIGURE 4 and comprising a series of friction discs 102 interposed between clutch plates 103 locked to shaft 47 by tangs extending into an axial groove 104 of the shaft. A drag adjusting knob 106 is threaded to the end of the shaft and serves to adjust the pressure between plates 103 and washers 102 and seat 106' for the latter formed in the hub of spool 46.

The operation of the described power-driven spinning reel will be readily understood from the foregoing detailed description of its components and their operative relationship one to the other. The assembly having been mounted on a fishing pole as described above, with line 58 extending through the usual guide loops 107 secured to the underside of the rod. To cast the line the fisherman manually rotates control bail 108 to its casting position (shown in dotted lines in FIGURE 1) and latches it there by the conventional latch 109, engaging in notch 105 of the bail hub in a manner well known to those skilled in this art. Line 58 is now free to feed freely from the reel as its weighted end is cast in the usual manner.

If the fisherman now wishes to troll he will usually prefer to use motor 20 to drive the reel. To do so he first chooses the speed at which he wishes to drive the motor by setting switch button 27 in either the "high" or the "low" speed position, the high speed position is effective to connect the batteries to the motor in series whereas the low speed operation occurs when the switch is shifted to connect the batteries to the motor in series-parallel. The fisherman then places his index finger beneath operating trigger 111 of switch 110 thereby energizing the motor. Rotation of the motor through its speed reduction gearing rotates input shaft 39 thereby engaging clutch 41 to drive worm 42. Rotation of this worm drives worm gear 43 clockwise as viewed in FIGURE 2 and rotates worm 48 to rotate cup 45 of the reel. Initial rotation of this cup is effective to disengage latch 109 from notch 105 allowing bail 108 to snap to its alternate position wherein line 58 is seated in a groove 112 of bail 108 in which position further rotation of cup 45 coils the spool 46. Rotation of the worm 48 also rotates worm 50 of the spool reciprocating mechanism causing worm wheel 52 to rotate and reciprocate the nonrotating shaft 47 supporting spool 46. Accordingly as the cup 45 rotates, the spool is reciprocated back and forth to coil the line in layers on the spool.

The operator may shift speed at any time simply by moving speed control button 57 to its alternate position. Likewise he may discontinue operation of the motor at any time and use crank 68 to drive the reel. If the motor is detached and the crank is used to store the line on the reel, it is important that the motor driven shaft 39 be locked against rotation. This is assured by lock 98' on cover device 93 since this lock engages with the slot across the end of shaft 39 and holds the smaller component of clutch 41 stationary. Hence rotation of the crank is effective to drive the reel as clutch 41 coasts freely in disengaged position. If the load placed on the line tends to rotate cup 45 in the reverse direction clutch 41 engages and attempts to drive shaft 39 in the opposite direction to its normal direction of rotation but such rotation is impossible because of the described locking action provided by stud 97 and lock pin 98' carried by cover device 93. Hence the line can play out from the spool under the control provided by the setting of the friction drag control knob 106.

There is practically no backlash in either of the one-way clutch devices either disengaging automatically as the alternate driving unit starts to rotate. It will also be understood that the motor may be detached while leaving the batteries and the battery housing secured in place for both the motor and the battery housing may be quickly detached from the rod while leaving the wheel proper and the converter housing 16 assembled to the rod.

While the particular power-driven spinning reel assembly herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A fishing reel assembly selectively operable manually and from motor means forming part of said reel assembly, said assembly comprising a main frame, motor means mounted on said main frame and including speed reduction means, a normally nonrotatable spool mounted on said main frame, a flyer rotatable on said frame to wind line onto said spool, manual drive means including first one-way clutch means having its driven side connected to said flyer, and transmission means driven by said motor means and including a second one-way clutch having the driven side thereof operatively connected to drive said flyer when said motor means is energized, and control means for activating said motor.

2. A fishing reel assembly as defined in claim 1 characterized in that said motor means includes means for operating the same selectively at two different speeds at the user's option.

3. A fishing reel assembly as defined in claim 1 characterized in that said transmission means includes coupling means for holding the same detachably connected to the second one-way clutch.

4. A fishing reel assembly as defined in claim 3 characterized in the provision of detachable cover means including means for holding the same detachably locked to said main frame in lieu of said motor when the motor is detached.

5. A fishing reel assembly as defined in claim 1 characterized in that a pull applied to the end of a line coiled on said line reel subassembly is effective to engage said second clutch means and attempt to drive said speed reduction means in the reverse direction, and said speed reduction gearing being non-reversible when an attempt is made to drive the same from its output end.

6. A fishing reel assembly as defined in claim 3 characterized in the provision of cover means securable to said main frame in lieu of said motor means and including positive lock means engageable with the input side of said second one-way clutch means and cooperating therewith to lock said first and second clutches against rotation so long as there is a pull on the line.

7. In combination, a spinning type fishing reel having a non-rotating spool, means reciprocably mounting said spool for axial movement, a rotatable cup embracing the inner end of said spool, a first and a second drive for said rotating cup including a first and a second one-way clutch means connected in series, motor means connected to the input side of said second clutch means, manual drive means connected to the input side of said first clutch means, and means interconnecting the output sides of said first and second clutch means and said rotating cup to drive said rotating cup and reciprocate said spool whereby the rotation of either output side of said first and second clutch means is effective to drive said rotating cup.

8. The combination defined in claim 7 characterized in that said manual drive means includes a double-ended input connection to either lateral side of said first one-way clutch means, and manually operable crank means including coupling means for holding said crank means detachably coupled to either end of the input to said first one-way clutch means whereby said manual means can be conveniently operated by the right and left hand at the user's option.

9. The combination defined in claim 7 characterized in the provision of a self-contained power supply for energizing said motor, and manually operated means for energizing said motor from said power supply selectively at two different voltages thereby to operate said motor at two different speeds.

10. The combination defined in claim 9 characterized in that said power supply is enclosed in an elongated tubular housing having means for holding the same detachably supported on the handle end of a hand-held fishing rod.

11. The combination defined in claim 7 characterized in that said fishing reel includes means for holding said fishing reel, said driving motor and said manual drive detachably assembled as a unit to the handle end of a conventional fishing rod.

12. A unitary fishing reel assembly having means for holding the same detachably coupled to the handle end of a fishing rod, said assembly including a main housing, a line spool, shaft means mounting said spool for reciprocation generally parallel to the length of said rod, a flyer rotatably mounted on said main housing for winding line onto said spool, an electric motor having a driven output shaft mounted in said housing on an axis parallel to said spool axis and spaced therefrom, a first one-way clutch means connected between said motor and said output shaft, manual drive means for said flyer including one-way clutch means having the output side thereof operatively connected to said output shaft and said flyer to drive the latter in a direction to retrieve a fishing line coiled on said spool.

13. A unitary assembly as defined in claim 11 characterized in that said manual drive means includes a drive shaft extending transversely of said motor and spool axes in an area located therebetween.

14. A unitary assembly defined in claim 13 characterized in that the drive shaft of said manual drive means is accessible from the opposite lateral sides of said housing, and means for holding a driving crank detachably coupled to either end of said drive shaft.

15. In combination, a housing, a first and a second worm having their axes lying in a common plane and spaced from one another, a rotatable flyer having a bail-type line guide thereon rotatably connected with said first worm, a normally nonrotatable spool reciprocably mounted coaxial with said flyer, means connected with said first worm to reciprocate said spool during rotation of said flyer, worm wheel means meshing with each of said worms and including a one-way clutch having manually operable drive means effective to drive said worm wheel in one direction, motor means including a second one-way clutch means operatively connecting the same to drive said second worm in the same direction as said manual drive means, control means for activating said motor means to drive said flyer, and said motor and said manual drive means being usable selectively to drive said flyer.

16. The combination defined in claim 15 characterized in that said motor means includes coupling means for holding the same detachably coupled to said housing, and cover means securable to said housing in lieu of said motor means to seal the same against the entry of foreign matter when said motor means is detached and including means for preventing rotation of said second one-way clutch means in the reverse direction by a force acting on the fishing line.

17. The combination defined in claim 15 characterized in that said motor means is electrically energized, and a moisture-tight self-contained power supply for said motor means adapted to be secured to a fishing rod along with said housing.

18. The combination defined in claim 17 characterized in the provision of means for detachably coupling said power supply to the handle end of a conventional fishing rod.

19. The combination defined in claim 17 characterized in that said power supply includes a plurality of batteries connected in series and including switch means and electrical connections operable to energize said motor means from said batteries at two different voltages thereby to operate said motor means at two different speeds.

20. The combination defined in claim 17 characterized in that said self-contained power supply means includes an elongated housing, and means at one end of said housing for holding the same removably coupled co-axially of the handle of a fishing rod.

21. The combination defined in claim 17 characterized in that said power supply comprises a storage battery means, and means for recharging said storage battery means from a vehicle storage battery and including diode means operating to prevent recharging of said power supply batteries if the charging connections to the vehicle battery are connected thereto in reverse polarity.

22. The combination defined in claim 21 characterized in that said recharging means includes power input connector plug means insertable into the female socket of a vehicle cigarette lighter whereby said storage batteries can be recharged by temporarily plugging said charging means into said cigarette lighter socket in lieu of the lighter.

References Cited

UNITED STATES PATENTS

| 2,190,398 | 2/1940 | Bugatti | 43—21 |
| 2,745,607 | 5/1956 | Taggart et al. | 242—84.21 |
| 2,758,801 | 8/1956 | Bonanno | 242—84.21 |
| 3,116,892 | 1/1964 | Pickard | 242—84.1 |

FOREIGN PATENTS

| 8,033 | 6/1961 | Japan. |

FRANK J. COHEN, *Primary Examiner.*

B. S. TAYLOR, *Assistant Examiner.*